Oct. 8, 1968 S. KRAUTHAMER 3,405,346

INVERTER CIRCUIT WITH MAGNETIC BIAS TO DELAY LOAD CURRENT RISE AND WITH PRE-CHARGE CIRCUIT FOR COMMUTATING CAPACITORS

Filed Oct. 11, 1965

INVENTOR

Stanley Krauthamer

BY James J. Jennings, Jr.

ATTORNEY 3,405,346

INVERTER CIRCUIT WITH MAGNETIC BIAS TO DELAY LOAD CURRENT RISE AND WITH PRE-CHARGE CIRCUIT FOR COMMUTATING CAPACITORS

Stanley Krauthamer, Monterey Park, Calif., assignor to Borg-Warner Corporation, Chicago, Ill., a corporation of Illinois Filed Oct. 11, 1965, Ser. No. 494,712
2 Claims. (Cl. 321—45)

ABSTRACT OF THE DISCLOSURE

Magnetic bias transformers 52, 55 coupled in series with the controlled rectifiers are initially reverse biased to saturation to delay the rise in load current through the rectifiers until the signal injected at the gate has been propagated across the rectifiers. A pre-charge circuit 16 provides an independent path for supplying energy to the commutating capacitors.

This invention is directed to an inverter circuit which employs semiconductor rectifiers, and more particularly to such a circuit which includes means for increasing the effectiveness of the commutation and for minimizing the possibility of damage to the semiconductor components.

In the last seven years the utilization of semiconductor rectifiers has increased as the current-handling capacity of a silicon-controlled rectifier (SCR) has been increased. Today, SCR's are available which can pass hundreds of amperes and thus the application of these components in various inverter circuits is widespread. With the increasing use of SCR's certain problems have become apparent.

Upon examining SCR's which have failed or broken down physically during inverter operation, it has been determined that a great number of such failures occur during the commutation interval when one SCR has just been switched on and its associated SCR is being turned off. Moreover, it appears that such failure occurs physically near the gate element of the SCR. Looking at an SCR in section, it appears generally circular with the gate element being limited to a minor area at one point on the circumference. Thus, when a "fire" or gating signal is applied to the gate element to inject carriers and initiate anode-cathode conduction, this conduction commences immediately adjacent the gate element and gradually spreads in a circular wave front over the entire SCR. This propagation is essentially the same as would be visible to the eye if one stood at the edge of a circular pond which was completely still, and dropped a stone into the pond at the edge. The circular waves caused by the initial drop of the stone gradually extend outwardly from the point of impact and eventually reach the opposite shore of the pond.

Even though the analogous phenomenon in an SCR occurs in a very short time period, of the order of one to three microseconds, breakdown of the SCR can still occur. Physical analyses of the SCR's which have failed indicate that when the energizing voltage is available at the time the SCR is gated on, and the load current is also applied to the SCR upon triggering of its gate element, the complete load current initially passes through the SCR along a very small arcuate path adjacent the gate. This path is very small in cross section compared to the total area of the SCR. Accordingly, even though the SCR is rated to handle the load current, this initial conduction along the small path adjacent the gate can destroy the SCR. It is thus a primary consideration of the present invention to obviate such SCR breakdown upon the initiation of conduction.

One area in which significant circuit improvement has been made to enhance the effectiveness of the commutation is in the provision of a "pre-charge" circuit. Frequently commutating capacitors are utilized to assist in providing rapid turn-off of one SCR as a corresponding SCR is switched on.

If for some reason the total voltage available to charge the capacitors is low, as when the system is started or when the voltage is deliberately lowered for some reason, the commutating capacitors may not be charged to a level sufficiently high for positive commutation. Accordingly, the pre-charge circuit is incorporated to provide a constant voltage of sufficient amplitude to maintain effective, positive commutation both when the system is started and thereafter when the inverter energizing voltage may be lowered for one reason or another. This auxiliary or pre-charge circuit represents another power demand, and thus it is another salient consideration of the present invention to substantially reduce the amount of energy required to be delivered by the pre-charge circuit to maintain constant and effective commutation.

The present invention finds utility in an inverter circuit which includes at least one semiconductor rectifier component such as an SCR. In accordance with a first aspect of the invention, an inductor or magnetic bias means is provided in series with the SCR to delay the rise of load current through the SCR for a very brief time period after that SCR has been gated on. This operation enables the gating signal applied to that SCR to have a "head start" compared to the passage of load current and thus permit the SCR to conduct the load current over a much broader area than would be possible if the full load current were applied concomitantly with the application of the gating signal.

In accordance with another important aspect of the invention the pre-charge circuit is coupled to the commutating capacitors and a pair of decoupling rectifiers are provided between the pre-charge conductors and the main D-C conductors. This circuit configuration provides the initial charging of the commutating capacitors from the main D-C circuit which energizes the inverter, and during the start-up portion of the cycle and later when the D-C voltage is low, the requisite additional voltage is provided from the pre-charge circuit to the commutating capacitors. Thus with this arrangement the pre-charge circuit provides only that portion of the requisite commutating energy which is not supplied over the main D-C conductors, minimizing the energy required for the pre-charge circuit.

To enable those skilled int he art to make and use the invention, a description thereof will be set forth in connection with the accompanying drawing, in the several figures of which like reference numerals identify like elements, and in which.

*General system arrangement*

The invention will be explained in connection with a motor control system such as that shown generally in FIGURE 1. Those skilled in the art will appreciate that the invention is applicable to other systems which employ inverters, and likewise to systems which include only one phase as well as three-phase inverter systems.

Figure 1:
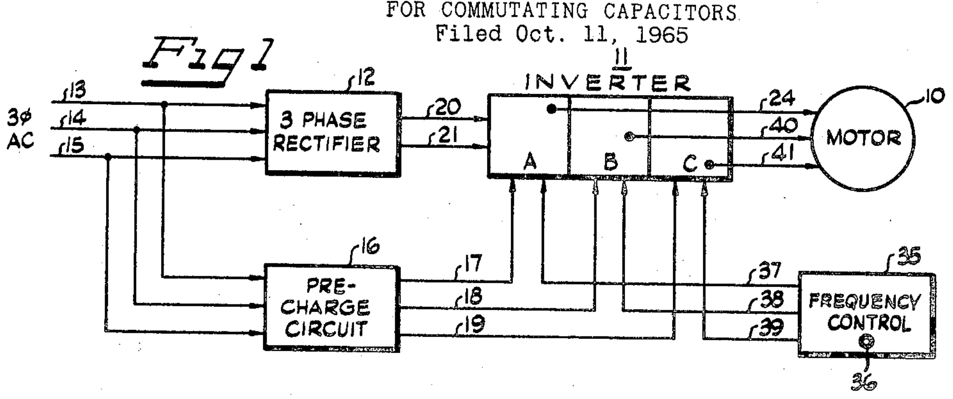
FIGURE 1 is a block diagram of a system in which the invention finds utility.

FIGURE 1 depicts generally a system for regulating the speed of a motor 10 in accordance with the frequency of alternation of the energy supplied from inverter 11. The inverter in turn is energized over conductors 20, 21 from a three-phase rectifier 12, in its turn energized over conductors 13, 14 and 15 from any conventional source (not shown) of three-phase alternating energy. For those arrangements in which only single phase operation is required, a single phase source can provide energy over two input conductors to the rectifiers.

The three-phase energy is also applied to a precharge circuit 16 in which the A-C energy is rectified. Use of a three-phase input circuit minimizes the ripple in the substantially constant D-C voltage passed from circuit 16 over conductors 17, 18 and 19 to the three inverter phase circuits 11A, 11B and 11C. A single line such as that referenced 17, may represent more than one conductor, as will be made clear in the subsequent explanation.

Frequency of inverter operation is regulated by a frequency control unit 35, having an adjusting knob 36 and three output conductors 37, 38 and 39. These conductors are respectively coupled to the phase circuits 11A, 11B and 11C. The frequency control unit 35 may be an oscillator with the knob 36 being a front panel control for providing regulation of the output frequency from oscillator 35. This unit may also take different forms, such as a master oscillator which provides a signal of standard frequency series-coupled with a digital countdown unit, the countdown unit being adjustable to provide an output pulse in response to receipt of a preset number of timing pulses from the master oscillator. Application of the timing pulses over conductors 37–39 establishes the operating frequency of inverter 11 and thus controls the speed of motor 10 as output energy from inverter 11 is transferred over output conductors 24, 40 and 41 to motor 10.

Although not depicted in the drawings, those skilled in the art will appreciate that various other components, such as a variable amplitude transformer, a "chopper" unit, a phase control power supply, and so forth, could be provided between inverter 11 and motor 10 to afford regulation of the amplitude of the alternating energy passed to the motor. In that the specific circuits and the interconnection of such arrangements are not necessary to complete understanding of the present invention, such arrangements have not been shown in the drawing.

*The present invention: Structure*

Figure 2:
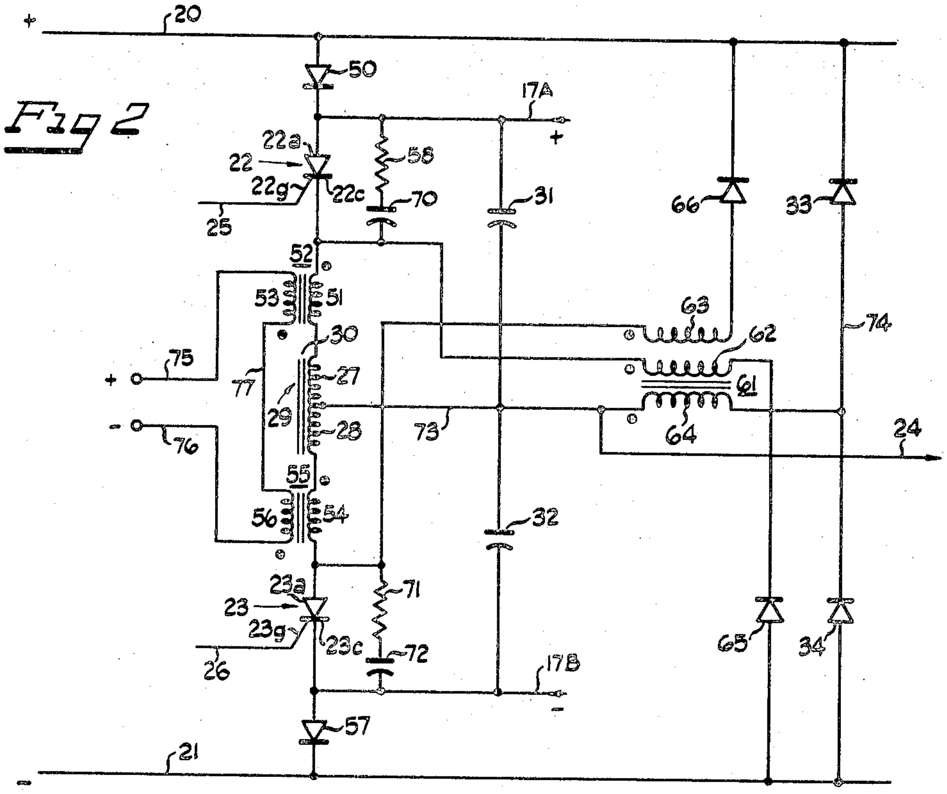
FIGURE 2 is a schematic diagram depicting one phase of the inverter circuit shown generally in FIGURE 1.

FIGURE 2 illustrates the main D-C conductors 20 and 21 over which unidirectional operating energy is received from rectifier 12. Coupled in series between these conductors is a main circuit including a first decoupling diode 50, a semiconductor controlled rectifier 22, primary winding 51 of a first magnetic bias transformer 52, winding portions 27 and 28 of a commutating choke assembly 29, which includes a common core 30, primary winding 54 of a second magnetic bias transformer 55, another semiconductor controlled rectifier 23, and a second decoupling diode 57. Coupled in parallel with the first SCR 22 is a transient minimizing circuit comprising a resistor 58 and a capacitor 70. A similar circuit including a resistor 71 and a capactor 72 is coupled in parallel with SCR 23.

As noted previously, the single conductor 17 in FIGURE 1 actually represents two separate conductors, referenced 17A and 17B in FIGURE 2. The pre-charge voltage for PHASE A of inverter 11 is provided between conductors 17A and 17B, with the voltage at conductor 17A being positive with respect to that on conductor 17B. Commutating capacitor 31 is coupled between conductor 17A and a conductor 73 which is coupled to the midpoint of a commutating choke assembly 29, and the other commutating capacitor 32 is coupled between conductor 73 and precharge conductor 17B. Load conductor 24 is also coupled to conductor 73.

An energy return transformer 61 is provided as shown and includes a secondary winding 64 coupled between conductor 73 and conductor 74, and this transformer also comprises primary windings 62, 63. Spillover diodes 33, 34 are provided as shown, coupled in series between conductors 20 and 21 with the common connection of these diodes being coupled over conductor 74 to one end of secondary winding 64. One end of primary winding 62 is coupled over energy return diode 65 to conductor 21, and the other end of this winding is coupled to the common connection between winding 51 and the cathode of SCR 22. One end of the other primary winding 63 of transformer 61 is coupled through another energy return diode 66 to conductor 20, and the other end of this winding is coupled to the common connection between winding 54 and the anode of SCR 23.

The first magnetic bias transformer 52 includes a secondary winding 53, and the other magnetic bias transformer 55 includes a secondary winding 56. When a suitable bias potential is applied between conductors 75, 76, a circuit is completed for current flow from conductor 75 over secondary winding 53, conductor 77, and secondary winding 56 to conductor 76.

*The present invention: Operation*

To explain the operation of the circuit shown in FIGURE 2, it is assumed that the system is operating with an appropriate D-C potential applied between conductors 20 and 21. It is further assumed that a potential difference of the proper level to produce the requisite bias current flow is applied between conductors 75, 76 and that the precharge circuit is also energized by application of the requisite voltage between conductors 17A, 17B. To facilitate the explanation, it will be assumed that the inverter circuit is at a point in the operating cycle where SCR 23 is conducting and SCR 22 is non-conducting.

Under these conditions, load current flows from the load (not shown) over conductors 24, 73, winding 28 of the commutating choke assembly, primary winding 54 of the second magnetic bias unit, the anode-cathode path of SCR 23, and diode 57 to conductor 21. Accordingly commutating capacitor 32 is in effect shorted out. When SCR 22 was switched off the other commutating capacitor 31 became charged over a circuit extending from conductor 20, over diode 50, conductor 17A, capacitor 31, conductor 73, windings 28, 54, SCR 23 and diode 57 to conductor 21. In the event capacitor 31 is not charged to the requisite commutating voltage level by reason of the potential difference then applied between conductors 20, 21 being inadequate, charging current thereafter flows from the pre-charge circuit over conductor 17A, through capacitor 31, thence over conductor 73 and the remainder of the just described charge circuit.

The purpose of the magnetic bias circuit including transformers 52 and 55 is to provide a time delay in current rise through an SCR as it is gated on. To this end the potential difference is applied between conductors 75, 76 in the proper sense to bias the magnetic structure, the cores of transformers 52 and 55, in a direction opposite to the direction of magnetization effected by current flow through primary windings 51 and 54. Further, the initial or biasing magnetizing current flow through the circuit including conductors 75, 76 is of the proper amplitude to drive the cores of transformers 52, 55 completely into saturation in one direction, which will be termed the negative direction for purposes of explanation. Accordingly at the time that SCR 23 is conducting, the core of transformer 52 is in saturation in the negative direction, that is, the direction opposite to that which would be effected by load current flow through SCR 22 and through primary winding 51 of this transformer.

A simple magnetic delay means, such as an inductor including a core and a winding, could be utilized in place of each magnetic bias transformer. However, as the load current diminishes to zero the remanent magnetic state of the inductor would only return to zero and thus the same measure of time delay, and corresponding protection for the SCR, would not be realized with the simple inductor arrangement. For this reason the preferred embodiment employs magnetic bias transformers, with the core of each transfomer being driven into negative saturation before the load current is passed through its primary winding.

Figure 3:
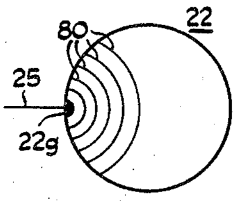
FIGURES 3 and 4 are illustrative showings, useful in explaining the problems overcome by the invention.
Figure 4:
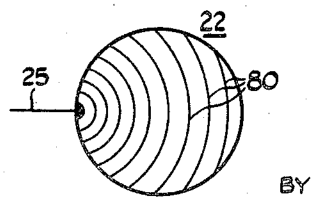

Responsive to receipt of a trigger signal over conductor 25, SCR 22 is rapidly switched on. As shown in FIGURE 3, the conductive area is gradually increased as represented by the lines 80 emanating from gate 22g. At some time thereafter, as shown in FIGURE 4, the anode-cathode conduction will be across the complete area of the SCR. Thus it is desirable to delay the rise of the load current in the SCR to alow the gate sufficient time to effect conduction across substantially all of the SCR.

As SCR 22 is gated on, load current commences to flow from conductor 20 over diode 50, SCR 22, primary winding 51 of transformer 52, winding 27 of commutating choke assembly 30, and conductors 73, 24 to the load. In accordance with an important aspect of the present invention, the rise of load current through SCR 22 is delayed by reason of the magnetic bias afforded by transformer 52. All magnetic transformers have a volt-second absorption characteristic. That is, when a voltage is applied across a fixed number of turns wound on a core, some finite time is required to saturate the core. Accordingly the load current which commences to flow through winding 51 of this transformer must first change the remanent magnetic state of this core structure from completely negative, back to zero, and ultimately to saturation in the opposite or positive direction. This time delay is sufficiently long to protect the SCR against concentration of the complete load current over a relatively small area adjacent the gate. Such protection is necessary in that the magnetic coupling between windings 27, 28 of the commutating choke assembly affords a virtually instantaneous transfer of the load current from the circuit including SCR 23 to the upper circuit including SCR 22.

To assist in shutting off SCR 23, capacitor 31 commences to discharge as SCR 22 is gated on. The discharge circuit extends from the upper plate of capacitor 31 over conductor 17A, SCR 22, windings 51, 27 and conductor 73 to the lower plate of capacitor 31. The discharge of capacitor 31 provides an additional induced voltage in winding 27 which, by well-known autotransformer action, applies a voltage across the total commutating choke assembly to assist in shutting off SCR 23 and holding it off for the required time duration. After the capacitor 31 is completely discharged, the commutating energy stored in the commutating choke begins to discharge over a circuit which extends from the bottom of winding 28 over winding 54, primary winding 63 of the energy return transformer and diode 66 to conductor 20. In addition to this conductive path for energy return, the circuit operates in a manner which is now known to transfer energy over the secondary winding 64 of transformer 61 and over the one of the diodes 33, 34 then in the circuit path back to the D-C input circuit. It is evident that as SCR 23 was switched off by the described commutating action, and after the return of the commutating energy from choke assembly 29 over the path which includes primary winding 54, during the remainder of this half cycle of operation (SCR 23 off and SCR 22 on) there is no current flow through primary winding 54. The core of transformer 55 would thus remain in positive saturation without the application of the bias potential difference between conductors 75, 76. In accordance with another important aspect of this invention, the current flow requisite for the negative magnetic bias flows over conductor 75, secondary winding 53 of transformer 52, conductor 77, secondary winding 56 (now acting as a primary winding) of transformer 55, back to conductor 76. This current flow through winding 56 is of the proper direction and magnitude to change the remanent magnetic state of the core of transformer 55, driving it from positive saturation back through zero to negative saturation. In this way, the magnetic bias to protect SCR 23 against premature application of the load current when it is subsequently gated on is effectively provided.

Previously, with SCR 23 conducting, capacitor 32 was in effect shorted out. However, with turn-off of SCR 23 and the switching on of SCR 22, capacitor 32 begins to charge from conductor 20 over diode 50, SCR 22, windings 51, 27, conductor 73, capacitor 32, and diode 57 to conductor 21. If for any reason the unidirectional potential difference then applied between conductors 20 and 21 is inadequate to charge capacitor 32 to a sufficiently high voltage level to effect proper commutation, the capacitor thereafter charges from conductor 73, through the capacitor 32 to conductor 17B. It is again emphasized that the pre-charge circuit of this invention functions only to provide a measure of charge for the commutating capacitors in addition to that previously provided from the unidirectional energy passed to the inverter circuit, and further this auxiliary energy is only provided when the main inverter D-C energy level is below the value requisite for proper commutation. It is apparent that such operation minimizes the energy utilized in the pre-charge circuit.

By way of example only and in no sense by way of limitation, the core material for transformers 52 and 55 can be a high permeability, nickel-iron alloy steel about 2 mils in thickness. The turns may include three turns on the primary winding (such as 51) and 15 turns on the secondary winding (such as 53). These turns and the usual insulation should be rated to withstand 3,000 volts. The potential difference applied between conductors 75, 76 should be of a level to produce sufficient ampere-turns so that as the bias current flows in windings 53 and 56, one of the cores (the core of that transformer with no load current then flowing in its primary winding) is completely saturated in the negative direction.

*Summary*

The present invention represents another significant step forward in upgrading the current handling ability of an inverter circuit using SCR's or other semiconductor controlled rectifiers. The magnetic bias or current delay circuit protects the controlled rectifier against the type of failure previously noted when the full load current was transferred to the rectifier immediately upon application of a trigger signal to the gate.

By providing a pre-charge circuit configuration which always charges the capacitors to a level at which effective and positive commutation is assured, without providing any more energy through the pre-charge circuit than required by reason of a lower voltage delivered to the main inverter, additional economies are effected.

Although only a particular embodiment of the present invention has been described and illustrated, it is manifest that various modifications and alterations may be made therein. It is therefore the intention in the appended claims to cover all such modifications and alterations as may fall within the true spirit and scope of the invention.

The embodiments of the invention in which an exclusive property or privilege is claimed are defined as follows:

1. An inverter circuit comprising a pair of input conductors, a first semiconductor controlled rectifier coupled to one of said input conductors, a magnetic current transfer means coupled to said first rectifier, a second semiconductor controlled rectifier coupled between said magnetic current transfer means and the other of said input conductors, a load conductor coupled to an intermediate point of said magnetic current transfer means, a first commutating capacitor having one plate coupled to said load conductor and the other plate coupled to the side of the first rectifier remote from said load conductor, a second commutating capacitor having one plate coupled to said load conductor and the other plate coupled to the side of the second rectifier remote from said load conductor, a magnetic bias circuit comprising bias means coupled in series with each of said rectifiers and having core portions initially biased to magnetic saturation in a direction opposite the direction of saturation later effected by load current flow through said rectifiers to delay the rise of load current through each of said rectifiers as they are gated on, and a pre-charge circuit comprising a first conductor coupled to said other plate of the first commutating capacitor and through a decoupling diode to said one input conductor, a second conductor coupled to said other plate of said second capacitor and through a second decoupling diode to said other input conductor, and means coupled to said first and second conductors for establishing a substantially constant potential difference therebetween to insure effective charging of each of said commutating capacitors to the voltage provided by the pre-charge circuit notwithstanding variation of the voltage level supplied over said input conductors to the inverter circuit.

2. In an inverter circuit comprising a pair of input conductors, a first semiconductor controlled rectifier coupled to one of said input conductors, a commutating choke having a pair of end portions, one of which is coupled to said first controlled rectifier, a second semiconductor controlled rectifier coupled between the other end portion of said commutating choke and the other of said input conductors, a load conductor coupled to an intermediate point of said commutating choke, a first commutating capacitor having one plate coupled to said load conductor and the other plate coupled over a first common point to the side of the first controlled rectifier remote from said load conductor, and a second commutating capacitor having one plate coupled to said load conductor and the other plate coupled over a second common point to the side of the second controlled rectifier remote from said load conductor, the improvement which comprises:

a magnetic bias circuit comprising a pair of bias transformers each having a primary winding and a secondary winding wound on a core, the secondary winding of one of said bias transformers being coupled between said first semiconductor controlled rectifier and said one end portion of the commutating choke, the secondary winding of the other of said bias transformers being coupled between said other end portion of the commutating choke and said second semiconductor controlled rectifier, and circuit means for applying a potential difference to the primary windings of both transformers to bias both cores to magnetic saturation in a direction opposite to the direction of saturation subsequently effected by load current flow through said semiconductor controlled rectifiers, thus delaying the rise of load current in each rectifier as it is gated on, a pre-charge circuit comprising a first diode coupled between said one input conductor and said first common point, a first pre-charge conductor coupled to said first common point, a second diode coupled between said other input conductor and said second common point, a second pre-charge conductor coupled to said second common point, and means for establishing a substantially constant potential difference between said first and second pre-charge conductors, to insure effective charging of each of said commutating capacitors to the voltage provided by the pre-charge circuit notwithstanding variation of the voltage level supplied over said pair of input conductors to the inverter circuit.

References Cited

UNITED STATES PATENTS 3,355,654 11/1967 Risberg ---------- 321—45 XR

JOHN F. COUCH, *Primary Examiner.*

WILLIAM SHOOP, *Assistant Examiner.*